(12) United States Patent
Lysén

(10) Patent No.: US 6,383,341 B1
(45) Date of Patent: May 7, 2002

(54) APPARATUS FOR OBTAINING PURE WATER FROM CRUDE WATER

(75) Inventor: Rune Lysén, Stockholm (SE)

(73) Assignee: HVR Water Purification AB, Stockholm (SE)

( * ) Notice: Subject to any disclaimer, the term of this patent is extended or adjusted under 35 U.S.C. 154(b) by 0 days.

(21) Appl. No.: 09/508,509

(22) PCT Filed: Sep. 17, 1998

(86) PCT No.: PCT/SE98/01668

§ 371 Date: Mar. 23, 2000

§ 102(e) Date: Mar. 23, 2000

(87) PCT Pub. No.: WO99/15463

PCT Pub. Date: Apr. 1, 1999

(30) Foreign Application Priority Data

Sep. 23, 1997 (SE) ............................................. 9703424

(51) Int. Cl.[7] .............................. B01D 3/00; C02F 1/04
(52) U.S. Cl. .................... 202/176; 62/238.5; 62/238.7; 159/DIG. 27; 159/DIG. 28; 159/901; 202/205; 203/11; 203/DIG. 4; 210/321.6; 210/321.75
(58) Field of Search .............................. 203/DIG. 4, 11, 203/10, 91, DIG. 17; 202/176, 185.3, 205; 159/DIG. 28, DIG. 27, 901; 62/238.5, 238.7; 210/321.6, 321.75

(56) References Cited

U.S. PATENT DOCUMENTS

| | | | | |
|---|---|---|---|---|
| 3,486,985 A | * | 12/1969 | McGrath | ..................... 202/173 |
| 4,181,577 A | * | 1/1980 | Foley | .......................... 202/205 |
| 4,278,502 A | * | 7/1981 | Stevens et al. | ......... 203/DIG. 4 |
| 4,345,971 A | * | 8/1982 | Watson | .......................... 203/10 |
| 4,402,795 A | * | 9/1983 | Erickson | ..................... 203/100 |
| 4,728,397 A | * | 3/1988 | Kjellander et al. | ........... 203/10 |
| 5,290,403 A | * | 3/1994 | Sääsk | ........................... 203/49 |
| 5,729,987 A | * | 3/1998 | Miller | ....................... 62/238.5 |

FOREIGN PATENT DOCUMENTS

| | | |
|---|---|---|
| SE | 408 637 | 6/1979 |
| SE | 411 446 | 12/1979 |
| SE | 448 085 | 1/1987 |

* cited by examiner

*Primary Examiner*—Virginia Manoharan
(74) *Attorney, Agent, or Firm*—Jacobson Holman, PLLC

(57) ABSTRACT

Apparatus for obtaining pure water from crude water includes an evaporator arrangement (10) that has a first circuit (101) for cirulating crude water, a second circuit (102) for circulating liquid coolant, and membrane elements for separating the circulating crude water form the circulating liquid coolant and for obtaining pure water from the crude water by a membrane distillation process. Connected to the first circuit (101) is one side (111) of a heat exchanger (11) for raising the evaporator arrangement (10). The apparatus also includes a heat pump (12) for lowering the temperature of the liquid collant prior to said coolant entering the evaporator arrangement (10). The high-temperature side (121) of the heat pump is connected to the input side (1021) of the second circuit (102) via the remaining side (112) of heat exchanger (11) and a cooling device (13). The low temperature side (122) of the heat pump is connected to the output side (1022) of the second circuit (102).

1 Claim, 1 Drawing Sheet

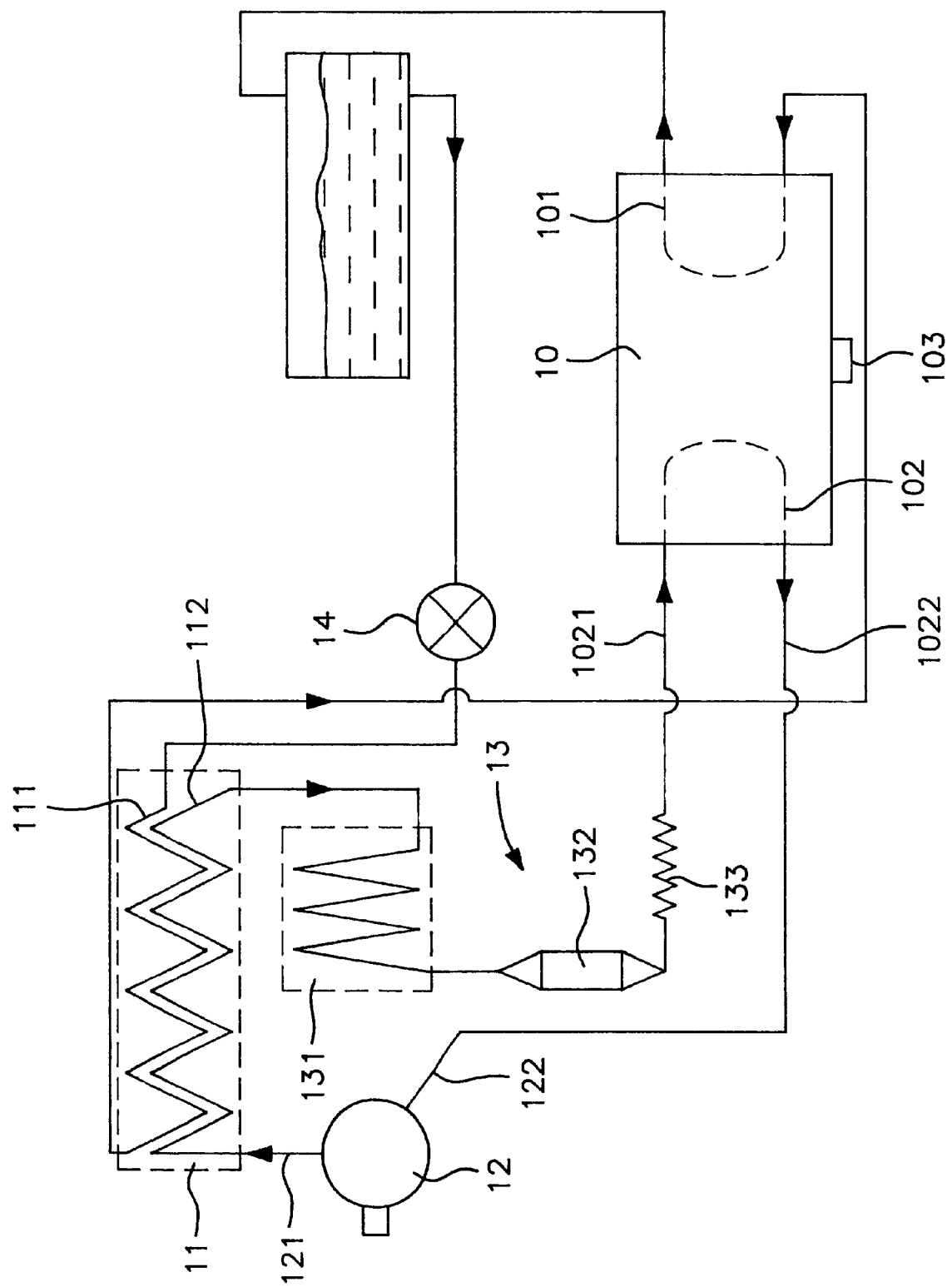

APPARATUS FOR OBTAINING PURE WATER FROM CRUDE WATER

This application is a 371 of PCT/SE 98/01668 filed Sep. 17, 1998.

FIELD OF INVENTION

The present invention relates to apparatus for obtaining pure water from crude water, and more specifically to such apparatus that include an evaporator arrangement having a first circuit for circulating crude water, a second circuit for circulating liquid coolant. Pure water is obtained from the crude water through the medium of membrane distillation.

The present invention relates to apparatus for obtaining pure water from crude water, and more specifically to such apparatus that include an evaporator arrangement having a first circuit for circulating crude water, a second circuit for circulating liquid coolant, and membrane elements for separating the circulating crude water from the circulating liquid coolant and for obtaining pure water from the crude water through the medium of membrane distillation with the aid of the membrane elements that delimit the circulating crude water.

DESCRIPTION OF THE BACKGROUND ART

It is known to purify water by means of different kinds of distillation processes, and it is also known to obtain fresh water from salt water for instance, by membrane distillation. See, for instance, Swedish Patent Specifications 408037 and 411446 in this regard.

Swedish Patent Specification 448085 expresses the aim of utilising the energy delivered to the process to a maximum. The process uses a membrane-equipped distillation unit, a first unit which functions to heat water to be distilled and to lead said water to one side of the membrane, and a second unit which functions to lead water that is colder than the first mentioned water to the other side of the membrane. The two units are interconnected by means of a connection line, such that water is transferred from the second unit to the first unit either intermittently or continuously. The water is heated to a requisite temperature in the first unit, by causing said water to flow via a heat exchanger that is connected to an energy source. Energy is transferred from the second unit to the first unit, by means of a heat pump and two further heat exchangers.

Access to drinkable water is a vital necessity for the survival of all mankind. Unfortunately, however, the natural availability of drinkable water differs significantly in different parts of the world. In places where the supply of drinking water is insufficient to meet prevailing needs, it is necessary to produce drinking water artificially, and at a price which is reasonable for the people and the places concerned.

Many of the processes, apparatuses and devices earlier used to produce drinkable water from salt water for instance are encumbered with drawbacks. For instance, such processes and apparatus are highly energy consuming, generate disturbingly high sound levels and produce water that has an excessively high temperature, all of which results in a liter price that is too expensive for many people.

The object of the present invention is to endeavour to eliminate these and other drawbacks to the greatest possible extent, and, as a result, to provide an energy-lean apparatus which operates at a low sound level and which will produce clean water at a suitable drinking water temperature of about 8–10° C.

SUMMARY OF THE INVENTION

According to the present invention, an apparatus of the aforesaid kind that includes an evaporator arrangement, a first circuit for crude water and a second circuit for liquid coolant, for obtaining pure water by means of membrane distillation and includes a heat exchanger which functions to raise the temperature of the crude water prior to said water entering the evaporator arrangement, said first circuit being connected to one side of said heat exchanger, and further includes a heat pump which functions to lower the temperature of the liquid coolant prior to said coolant entering the evaporator arrangement, wherein the high temperature side of said heat pump is connected to the input side of said second circuit via the remaining side of said heat exchanger and a cooling device, and wherein the low temperature side of said heat pump is connected to the output side of said second circuit.

The invention will now be described in more detail with reference to the accompanying drawing, which illustrates an apparatus constructed in accordance with the invention.

DESCRIPTION OF PREFERRED EMBODIMENTS

The illustrated apparatus includes an evaporator arrangement 10 that has a first circuit 101 in which crude water is circulated from a crude water tank through an evaporator arrangement 10, a second circuit 102 for circulating liquid coolant (water) through the evaporator arrangement 10 for obtaining pure water from the crude water by means of membrane distillation. Membrane distillation in itself is well known from the aforesaid patent specifications and need not therefore be described here.

The illustrated apparatus includes a heat exchanger 11 which functions to raise the temperature of the crude water prior to said water entering the evaporator arrangement 10 and which is connected on one side 111 to the first circuit 101. In the illustrated case, the original temperature of the crude water is 67° C., while the temperature of the water entering the evaporator arrangement 10 is 70° C.

The temperature of the liquid coolant is lowered prior to the coolant entering the evaporator arrangement 10, by means of a heat pump 12. The high temperature side 121 of the heat pump is connected to the input side 1021 of the second circuit 102 via the remaining side 112 of the heat exchanger 11 and a cooling device 13. The low temperature side 122 of the heat pump 12 is connected to the output side 1022 of the second circuit 102.

The cooling device 13 includes a condenser 131, a dryer 132, and a capillary pipe 133, and functions to lower the temperature of the liquid coolant from 70° C. to 5° C. The temperature of the coolant leaving the evaporator arrangement 10 is 8° C.

The modus operandi of the schematically illustrated apparatus is as follows:

At the beginning of the purification process, the heat pump 12 is started-up so as to deliver heat to the heat exchanger 11 and to cool the evaporator arrangement 10. There is activated at the same time a water pump 14 which sucks crude water from the crude water tank to the heat exchanger 11, in which the crude water is heated and then pumped into the first circuit 101 of the evaporator arrangement 10.

As the hot water circulates in the evaporator 10 and comes into the proximity of the liquid coolant, there is generated a vapour pressure which by membrane distillation produces a resultant condensate which runs down and collects at the outlet 103.

An apparatus of this construction will utilise substantially all available heat and cold in the heat pump process, i.e. the heat generated is utilised in heating the crude water at the same time as the cold thus generated is used to maintain the vapour pressure for carrying out the membrane distillation process, therewith resulting in low energy consumption.

The water purifying ability of the novel apparatus has been tested and several analysis measurements carried out. Table 1 below lists the concentrations of certain substances in the water, before and after its purification:

| I | | |
|---|---|---|
| | Bacteria from | 14,000 to 0 |
| | Salt from | 31,000 to 1 ppm |
| | Radon from | 380 to 4 Bq/l |
| | Plutonium from | 2.4 to 0.1 Bq |

Table II below lists the highest and lowest degree of purification in percent in respect of three different measurements for each substance:

| II | | |
|---|---|---|
| | Chloroform | 99.8–98.6 |
| | 1,1,1-trichloroethane | 99.9–99.6 |
| | Trichloroethylene | 99.7–99.4 |
| | Dichlorobromomethane | 99.8–98.7 |
| | Carbon tetrachloride | 99.7–98.7 |
| | Dibromochloromethane | 99.7–98.7 |
| | Bromoform | 99.6–97.8 |

What is claimed is:

1. An apparatus for obtaining pure water from crude water, comprising an evaporator arrangement (10) having a first circuit (101) for circulating crude water, a second circuit (102) for circulating liquid coolant, for obtaining pure water from the crude water by membrane distillation, a heat exchanger (11) connected to and receiving crude water from one side of said first circuit to raise the temperature of the crude water, an evaporator arrangement (10) having one side (111) connected to and receiving heated crude water from said first circuit (101), a heat pump (12) connected to said heat exchanger (11) to raise the temperature of crude water passing therethrough, said heat pump being connected to said second circuit to lower the temperature of the liquid coolant prior to said coolant entering said evaporator arrangement (10), a high-temperature side (121) of said heat pump being connected to an input side (1021) of said second circuit (102) by a remaining side (112) of said heat exchanger (11) and a cooling device (13), a low-temperature side (122) of said heat pump being connected to an output side (1022) of said second circuit (102).

* * * * *